US008858757B2

(12) United States Patent
Thompson

(10) Patent No.: US 8,858,757 B2
(45) Date of Patent: Oct. 14, 2014

(54) PLUG PLATE DISPENSING ASSEMBLIES

(75) Inventor: Brandon S. Thompson, Brooksville, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 70 days.

(21) Appl. No.: 13/569,593

(22) Filed: Aug. 8, 2012

(65) Prior Publication Data

US 2014/0041809 A1 Feb. 13, 2014

(51) Int. Cl.
*B32B 38/10* (2006.01)

(52) U.S. Cl.
USPC ............ 156/715; 156/719; 156/759; 156/767

(58) Field of Classification Search
CPC ................ B65C 9/0006; B65C 9/1865; B65C 2009/0009; B65C 11/004; B65H 37/002
USPC ......... 156/715, 719, 759, 760, 764, 767, 933, 156/944
See application file for complete search history.

(56) References Cited

U.S. PATENT DOCUMENTS

| | | | | | |
|---|---|---|---|---|---|
| 2,754,994 | A | * | 7/1956 | Cole | 221/73 |
| 3,369,952 | A | * | 2/1968 | Rieger | 156/577 |
| 3,537,933 | A | * | 11/1970 | Severance | 156/719 |
| 4,422,376 | A | * | 12/1983 | Teraoka | 101/69 |
| 5,302,222 | A | | 4/1994 | Larsen et al. | |
| 5,349,534 | A | | 9/1994 | Rousseff et al. | |
| 5,427,460 | A | * | 6/1995 | Kajiya | 400/118.1 |
| 5,570,809 | A | * | 11/1996 | Martin | 221/73 |
| 5,713,679 | A | * | 2/1998 | Taylor | 400/621 |
| 5,941,413 | A | * | 8/1999 | Roman | 221/73 |
| 6,199,614 | B1 | | 3/2001 | Snyder et al. | |
| 6,398,069 | B1 | | 6/2002 | O'Brien | |
| 6,533,015 | B1 | | 3/2003 | Moore | |
| 6,544,378 | B2 | | 4/2003 | Brough et al. | |
| 7,121,313 | B2 | * | 10/2006 | Ito | 156/767 |
| 2002/0096240 | A1 | | 7/2002 | Anderson et al. | |
| 2006/0249240 | A1 | * | 11/2006 | Dijkstra | 156/64 |
| 2007/0251647 | A1 | * | 11/2007 | Huang | 156/577 |
| 2009/0211712 | A1 | * | 8/2009 | Siedlaczek | 156/387 |
| 2012/0004770 | A1 | | 1/2012 | Ooyen et al. | |
| 2012/0043025 | A1 | * | 2/2012 | Yu Chen | 156/512 |

* cited by examiner

*Primary Examiner* — Mark A Osele
(74) *Attorney, Agent, or Firm* — Dinsmore & Shohl LLP

(57) ABSTRACT

In one embodiment, a plug plate dispensing assembly can include a first riser, a second riser, an apex cross member, a lower cross member, a central cross member, and a drive roller. The apex cross member, the lower cross member, and the central cross member can be coupled to the first riser and the second riser, and can extend from the first riser to the second riser. When the sheet stock is fed between the lower cross member and the apex cross member, over the apex cross member, and between the apex cross member and the central cross member, and when the sheet stock is frictionally engaged with the drive roller, rotation of the drive roller can cause one or more of the plurality of plug plates to at least partially detach from the sheet stock as the sheet stock passes over the apex cross member.

20 Claims, 4 Drawing Sheets

PLUG PLATE DISPENSING ASSEMBLIES

TECHNICAL FIELD

The present specification generally relates to dispensing assemblies and, more specifically, to plug plate dispensing assemblies.

BACKGROUND

During complex manufacturing processes (e.g., the manufacture of an automobile) a plurality of components and subassemblies can be joined with one another. For example, two shaped metal components can be welded to one another. Although, the weld may couple the metal components together, an undesired indication can be formed at the site of the weld. For example, a spot welding process may leave behind a depression in one of the metal components that is about the shape of the welding electrode. The undesired indication may be a sight that is prone to water intrusion, or may be the source of undesired sound, i.e., wind may cause vibration or whistling.

Self-adhesive plug plates can be utilized to cover the undesired indication during the manufacturing process. Generally, the plug plates are temporarily adhered to a sheet stock such that the plug plates can be removed from the sheet stock without damaging the plug plates. However, the removal of the plug plates can be a laborious manual process, which can slow down the manufacturing process. Moreover, a single component can require the application of a multitude of plug plates.

Accordingly, a need exists for alternative plug plate dispensing assemblies that reduce the time required to complete the plug plate removal process.

SUMMARY

In one embodiment, a plug plate dispensing assembly can include a base member, a first riser, a second riser, a reel support member, an apex cross member, a lower cross member, a central cross member, and a drive roller. The first riser can be coupled to the base member, and can extend upwards away from the base member. The second riser can be coupled to the base member and can be offset laterally from the first riser. The second riser can extend upwards away from the base member. The reel support member can be coupled to the first riser and the second riser and can extend from the first riser to the second riser. The reel support member can be disposed on a front side of the plug plate dispensing assembly, and can be configured to hold a reel comprising a plurality of plug plates adhered to a sheet stock. The apex cross member can be coupled to the first riser and the second riser, and can extend from the first riser to the second riser. The lower cross member can be coupled to the first riser and the second riser and can extend from the first riser to the second riser. The lower cross member can be disposed downwards from the apex cross member, and can be offset from the apex cross member towards the front side of the plug plate dispensing assembly. The central cross member can be coupled to the first riser and the second riser and can extend from the first riser to the second riser. The central cross member can be disposed downwards from the apex cross member and upwards from the lower cross member. The central cross member can be offset from the apex cross member towards a back side of the plug plate dispensing assembly. The drive roller can be rotatably engaged with the first riser and the second riser. When the sheet stock is fed between the lower cross member and the apex cross member, over the apex cross member, and between the apex cross member and the central cross member, and when the sheet stock is frictionally engaged with the drive roller, rotation of the drive roller can cause one or more of the plurality of plug plates to at least partially detach from the sheet stock as the sheet stock passes over the apex cross member.

In another embodiment, a plug plate dispensing assembly can include a base member, a first riser, a second riser, a reel support member, an apex cross member, a lower cross member, a central cross member, and a drive roller. The first riser can be coupled to the base member and can extend upwards away from the base member. The second riser can be coupled to the base member and offset laterally from the first riser. The second riser can extend upwards away from the base member. A reel support member can be coupled to the first riser and the second riser. The reel support member can extend from the first riser to the second riser and can be disposed on a front side of the plug plate dispensing assembly. The reel support member can be configured to hold a reel comprising a plurality of plug plates adhered to a sheet stock. The apex cross member can be coupled to the first riser and the second riser, and can extend from the first riser to the second riser. The lower cross member can be coupled to the first riser and the second riser, and can extend from the first riser to the second riser. The lower cross member can be disposed downwards from the apex cross member, and can be offset from the apex cross member towards the front side of the plug plate dispensing assembly. The central cross member can be coupled to the first riser and the second riser and can extend from the first riser to the second riser. The central cross member can be disposed downwards from the apex cross member and upwards from the lower cross member. The central cross member can be offset from the apex cross member towards a back-side of the plug plate dispensing assembly. The apex cross member, the central cross member, and the lower cross member can each have a substantially circular cross section that has a center point such that the center point of the apex cross member defines an apex of a release angle. A first ray can be defined from the center point of the apex cross member to the center point of the central cross member. A second ray can be defined from the center point of the apex cross member to the center point of the lower cross member. The release angle measured between the first ray and the second ray can be less than about 20°. A drive roller can be rotatably engaged with the first riser and the second riser. When the sheet stock is fed between the lower cross member and the apex cross member, over the apex cross member, and between the apex cross member and the central cross member, and when the sheet stock is frictionally engaged with the drive roller, rotation of the drive roller can cause one or more of the plurality of plug plates to at least partially detach from the sheet stock as the sheet stock passes over the apex cross member.

In a further embodiment, a plug plate dispensing assembly can include a base member, a first riser, a second riser, a reel support member, an apex cross member, a lower cross member, a central cross member, and a drive roller. The first riser can be coupled to the base member. The first riser can extend upwards away from the base member. The second riser can be coupled to the base member and offset laterally from the first riser. The second riser can extend upwards away from the base member. The reel support member can be coupled to the first riser and the second riser. The reel support member can extend from the first riser to the second riser and can be disposed on a front side of the plug plate dispensing assembly. The reel support member can be configured to hold a reel comprising a plurality of plug plates adhered to a sheet stock.

The apex cross member can be coupled to the first riser and the second riser, and can extend from the first riser to the second riser. The lower cross member can be coupled to the first riser and the second riser, and can extend from the first riser to the second riser. The lower cross member can be disposed downwards from the apex cross member, and can be offset from the apex cross member towards the front side of the plug plate dispensing assembly. The central cross member can be coupled to the first riser and the second riser, and can extend from the first riser to the second riser. The central cross member can be disposed downwards from the apex cross member and upwards from the lower cross member. The central cross member can be offset from the apex cross member towards a back side of the plug plate dispensing assembly. The apex cross member, the central cross member, and the lower cross member each can have a substantially circular cross section that has a center point. The center point of the apex cross member can define an apex of a release angle. A first ray can be defined from the center point of the apex cross member to the center point of the central cross member. A second ray can be defined from of the apex cross member to the center point of the lower cross member. The release angle measured between the first ray and the second ray can acute. The drive roller can be rotatably engaged with the first riser and the second riser. The sheet stock can be fed between the lower cross member and the apex cross member, over the apex cross member, and between the apex cross member and the central cross member. The sheet stock can be frictionally engaged with the drive roller. The sheet stock can fold over itself without touching above the lower cross member such that the sheet stock maintains a minimum gap G that is greater than about 0 mm and less than a sum of a first radius of the central cross member and a second radius of the lower cross member. Rotation of the drive roller can cause one or more of the plurality of plug plates to at least partially detach from the sheet stock as the sheet stock passes over the apex cross member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
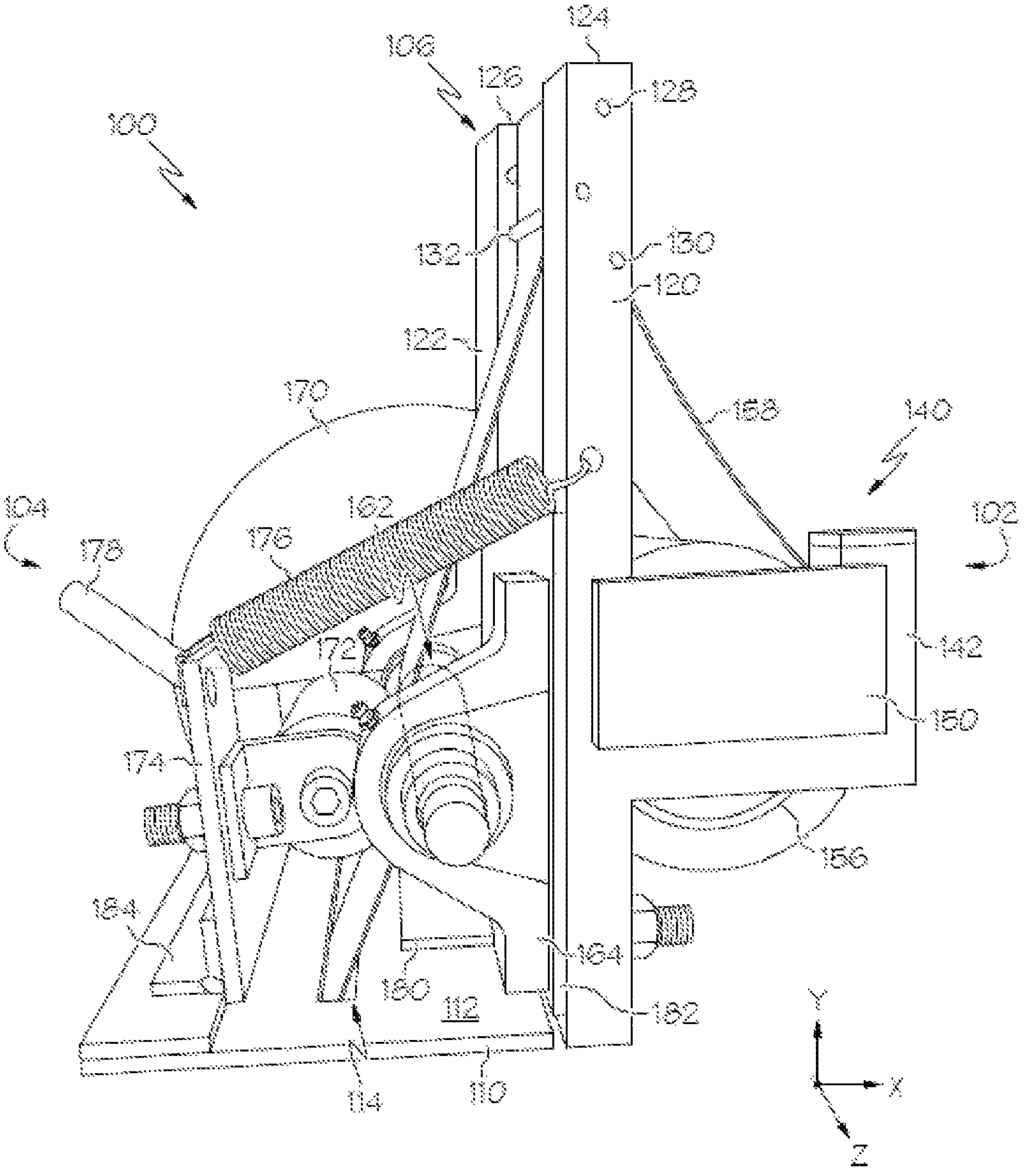
FIG. 1 schematically depicts a plug plate dispensing assembly according to one or more embodiments shown and described herein.

FIG. 1 generally depicts one embodiment of a plug plate dispensing assembly for dispensing plug plates from a reel comprising sheet stock with a plurality of plug plates adhered thereto. The plug plate dispensing assembly generally comprises a base member, a first riser and a second riser, a plurality of cross members spanning between the first riser and the second riser, a reel support member, and a drive roller. During normal operation, the drive roller can be actuated to pull the sheet stock from the reel while the reel is supported by the reel support member. The sheet stock can be fed through the plurality of cross members such that the plug plates are peeled from the sheet stock as the sheet stock moves through the plurality of cross members. Each of the aforementioned components of the plug plate dispensing assembly is described in more detail herein. Moreover, various embodiments of the plug plate dispensing assembly and the operation of the plug plate dispensing assembly are described in more detail herein.

Referring now to FIG. 1, the plug plate dispensing assembly 100 can comprise a base member 110 for providing a structural base for the plug plate dispensing assembly 100. The plug plate dispensing assembly 100 has a front side 102 and a back side 104 and extends from a base end 108 to a dispensing end 106, i.e., substantially along the positive Y-direction. The base member 110 can be located at the base end 108 of the plug plate dispensing assembly 100. The base member 110 can form a base platen 112 that can be utilized as a support surface for coupling components of the plug plate dispensing assembly 100. As used herein, the term "coupled" means that multiple objects are united together such as for example, bolted, welded, anchored, integral, and the like. Accordingly, "coupled" may mean that the respective objects are directly joined together or the respective objects may be joined together by one or more components there between. In some embodiments, the base member 110 may include an output orifice 114 formed there through for receiving and ejecting sheet stock 158 from the base end 108 of the plug plate dispensing assembly 100.

The plug plate dispensing assembly 100 can comprise a first riser 120 and a second riser 122 for providing a vertical support structure for various components of the plug plate dispensing assembly 100. The first riser 120 has a first distal end 124 that can be located at the dispensing end 106 of the plug plate dispensing assembly 100. Similarly, the second riser 122 has a second distal end 126 that can be located at the dispensing end 106 of the plug plate dispensing assembly 100. Accordingly, the first riser 120 and the second riser 122 can extend upwards (depicted as being substantially along the positive y-direction) away from the base member 110. Moreover, the first riser 120 and the second riser 122 can be laterally offset, substantially along the z-direction, from one another to form a void there between. Each of the first riser 120 and the second riser 122 can be formed from substantially rigid material such as, for example, a metal, a hard plastic or wood. Additionally, it is noted that, while the first riser 120 and the second riser 122 are depicted in FIG. 1 as being formed from square steel tubing, the first riser 120 and the second riser 122 can have any cross section suitable to provide an appropriate arrangement of cross members, as is described in greater detail below.

Figure 2:
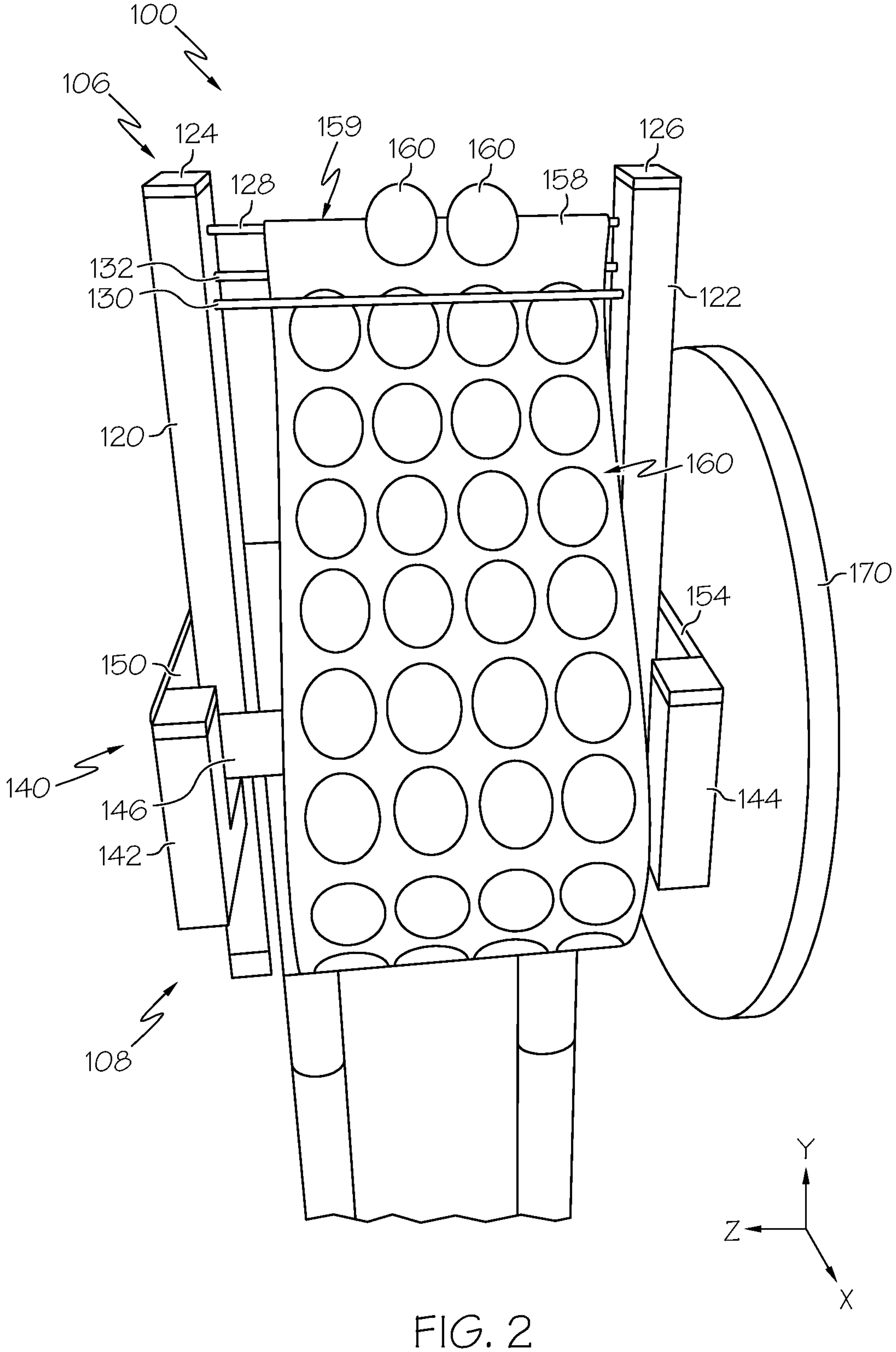
FIG. 2 schematically depicts a plug plate dispensing assembly according to one or more embodiments shown and described herein.

Referring now to FIG. 2, the plug plate dispensing assembly 100 can comprise a reel support member 140 for rotatably engaging the reel 156 of plug plates 160. The reel support member 140 can be any device configured to hold the reel 156 and allow the reel 156 to rotate to feed the sheet stock 158 of the reel 156 through the plug plate dispensing assembly 100. The reel support member 140 can be coupled to the first riser 120 and the second riser 122 along a front side 102 of the plug plate dispensing assembly 100 and can extend from the first riser 120 to the second riser 122. In one embodiment, the reel support member 140 can comprise a first socket member 142, a second socket member 144, and a supply rod 146. Each of the first socket member 142, the second socket member 144, and the supply rod 146 can be formed from substantially rigid material as noted above with respect to the first riser 120 and the second riser 122.

Each of the first socket member 142 and the second socket member 144 can be shaped to at least partially define a relief or a pocket for receiving the supply rod 146. For example, the first socket member 142 and the second socket member 144 can be formed into a substantially "U" shaped body. The first socket member 142 can be partially enclosed by a first end cap 150 and coupled to the first riser 120 to form a pocket for receiving the supply rod 146. Similarly, the second socket member 144 can be partially enclosed by a second end cap 154 and coupled to the second riser 122 to form a pocket for receiving the supply rod 146. Accordingly, the pockets formed by the first socket member 142 and the second socket member 144 of the reel support member 140 can be laterally offset from one another. The supply rod 146 can be received within the pockets and span the lateral offset between the first socket member 142 and the second socket member 144.

The plug plate dispensing assembly 100 can comprise a plurality of cross members for manipulating the sheet stock 158 and the plug plates 160 of the reel 156. The plug plates 160 can be formed from polyvinyl chloride with a self-adhesive layer that is adhered to a release coating on the sheet stock 158. The release coating of the sheet stock 158 can be formed from a material (e.g., wax) that is configured to allow the plug plate 160 to be removed without being damaged. It is noted that, while the plug plates 160 are depicted in FIG. 2 as being substantially disk shaped, the plug plates 160 can be formed into any desired shape suitable for covering defects in sheet metal.

In one embodiment, the plug plate dispensing assembly 100 can comprise an apex cross member 128, a lower cross member 130, and a central cross member 132 that can cooperate to constrain the sheet stock 158 and the plug plates 160 as the sheet stock 158 is fed through the plug plate dispensing assembly 100. Each of the apex cross member 128, the lower cross member 130, and the central cross member 132 can be coupled to the first riser 120 and the second riser 122 towards the dispensing end 106 of the plug plate dispensing assembly 100. The apex cross member 128, the lower cross member 130, and the central cross member 132 can span the offset between the first riser 120 and the second riser 122 to constrain the sheet stock 158 between the first riser 120 and the second riser 122. Additionally, as is explained in greater detail herein, the apex cross member 128, the lower cross member 130, and the central cross member 132 can influence the shape of the sheet stock 158 such that the plug plates 160 are at least partially removed from the sheet stock 158 when the sheet stock 158 is fed through the plug plate dispensing assembly 100.

Accordingly, the apex cross member 128, the lower cross member 130, and the central cross member 132 can be formed from any material suitable to span between the offset between the first riser 120 and the second riser 122 without substantial deflection during operation of the plug plate dispensing assembly 100. Generally, each of the apex cross member 128, the lower cross member 130, and the central cross member 132 should be formed from material substantially more rigid than the sheet stock 158 and the plug plates 160. For example, the sheet stock 158 and the plug plates 160 may bend around the lower cross member 130, while the plug plates 160 are adhered to the sheet stock 158. Suitable materials for forming the apex cross member 128, the lower cross member 130, and the central cross member 132 can include, but are not limited to, metal, hard plastic or wood.

Additionally, it is noted that, while the apex cross member 128, the lower cross member 130, and the central cross member 132 are depicted as steel rods, the apex cross member 128, the lower cross member 130, and the central cross member 132 can be formed in any shape that provides a radius at the interface between the apex cross member 128, the lower cross member 130, or the central cross member 132 and the sheet stock 158. Without being bound to theory, it is believed that if, during normal operation, the sheet stock 158 contacts sharp radiuses or corners at the apex cross member 128, the lower cross member 130, or the central cross member 132 the risk of tearing or binding of the sheet stock 158 can increase.

Figure 3:
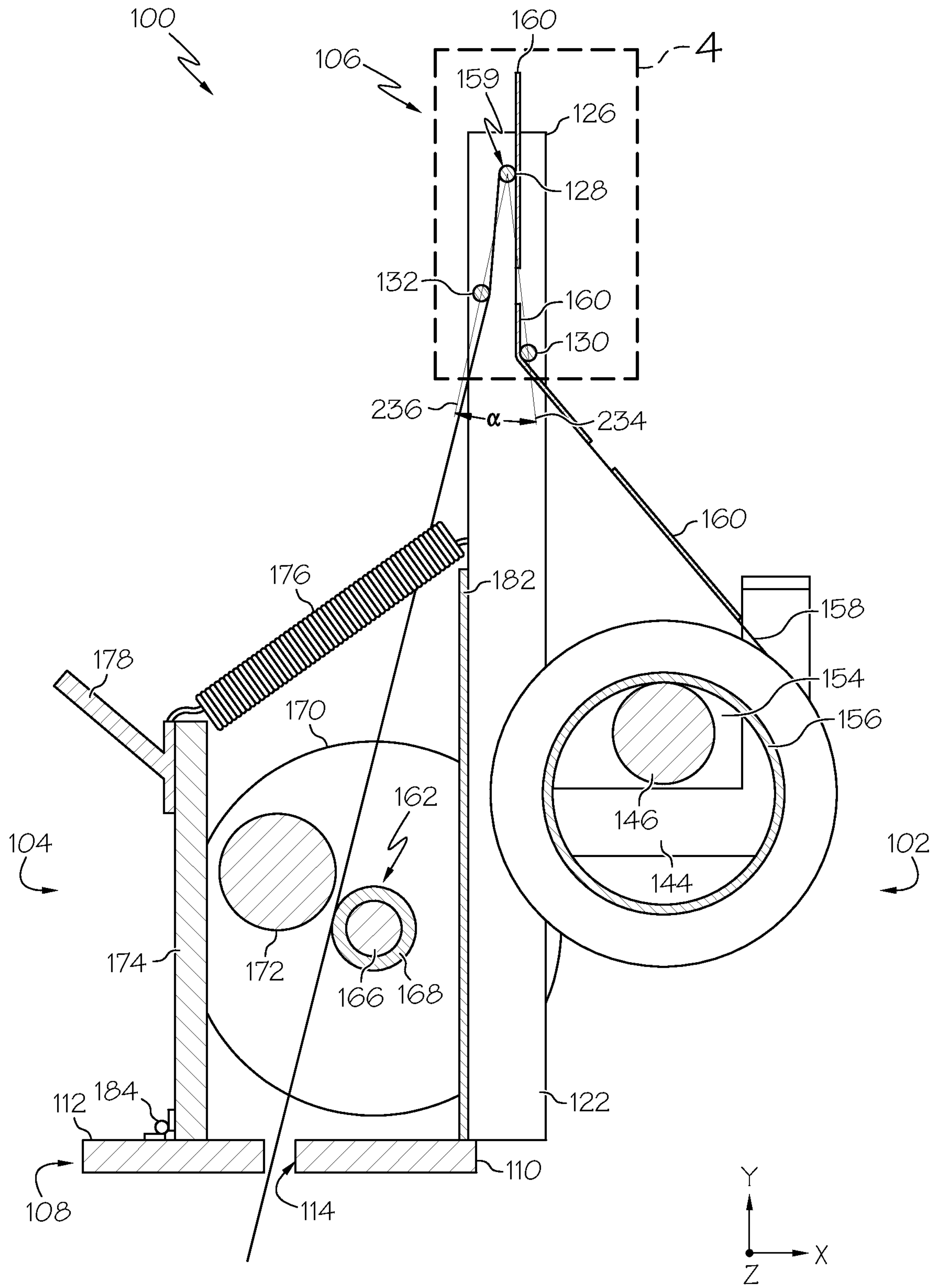
FIG. 3 schematically depicts a cross sectional view of a plug plate dispensing assembly according to one or more embodiments shown and described herein.

Referring now to FIG. 3, a cross-sectional view of the plug plate dispensing assembly 100 of FIG. 1 is schematically depicted. The plug plate dispensing assembly 100 can comprise a drive roller 162 for frictionally engaging the sheet stock 158 of the reel 156 and causing motion of the sheet stock 158 with respect to the plug plate dispensing assembly 100. The drive roller 162 can comprise a frictional layer 168 that is formed around an inner roller 166. The frictional layer 168 can comprise any material having a coefficient of friction that is high enough to grip the sheet stock 158 without substantial slippage during normal operation of the plug plate dispensing assembly 100 such as, for example, a polymer including a carbamate (urethane) functional group. The inner roller 166 can be formed from any rigid material, such as, for example a metal, a plastic, or wood. As used herein the term "frictionally engage" means to that multiple objects are in physical contact such the objects are substantially resistant to relative motion between the objects such as, for example, sliding or slipping. Accordingly, it is noted that while objects may be both frictionally engaged and coupled at the same time, objects that are frictionally engaged are not necessarily coupled. Similarly, objects that a coupled are not necessarily frictionally engaged.

Referring collectively to FIGS. 1-3, according to one embodiment of the plug plate dispensing assembly 100, the first riser 120 and the second riser 122 can be coupled to the base member 110. The first riser 120 can extends upwards away from the base member 110 and have a first distal end 124 that is offset upwards from the base member 110. The second riser 122 can extend upwards away from the base member 110 and have a second distal end 126 that is offset upwards from the base member 110. In some embodiments, the first riser 120 and the second riser 122 can be substantially parallel with respect to one another.

In one embodiment, a mounting bracket 180 can be coupled to the base platen 112 of the base member 110. The mounting bracket 180 can be coupled to a support member 182. The first riser 120 and the second riser 122 can be coupled to the support member 182 such that the first riser 120 is laterally offset from the second riser 122. Accordingly, the support member 182 can indirectly couple the first riser 120 and the second riser 122 to the base member 110. It is noted that, while the base member 110, the first riser 120, the second riser 122, the mounting bracket 180, and the support member 182 can be formed from any rigid material, additional rigidity and robustness can be realized by forming the base member 110, the first riser 120, the second riser 122, the mounting bracket 180, and the support member 182 from a metal such as, for example, steel or aluminum. Moreover, it is noted that, while FIGS. 1 and 2 depict bolts, the embodiments described herein can be coupled by any suitable manner including, but not limited to, welds.

The drive roller 162 can be rotatably engaged with the first riser 120 and the second riser 122. In one embodiment, the drive roller 162 can be rotatably engaged with two drive bearings 164. One of the drive bearings 164 can be coupled to the support member 182 and the first riser 120. The other of the drive bearings 164 can be coupled to the support member 182 and the second riser 122. Generally, the drive roller 162 and the reel 156 are aligned such that their respective axes of rotation are aligned, i.e., the axis that the drive roller 162 rotates around and the axis that the reel 156 rotates around are substantially parallel. It is noted that, while the drive bearings 164 are depicted in FIG. 1 as pillow block bearings, the drive bearings 164 can be any type of bearing that permits the drive roller 162 to rotate. Additionally, it is noted that the term "rotatably engage," as used herein, means that multiple objects cooperate with one another to define an axis of rotation and to permit at least one of the objects to turn around the axis of rotation. Accordingly, "rotatably engaged" may mean that the turning can be permitted via the respective objects cooperating directly or via one or more interposed components.

The plug plate dispensing assembly 100 can further comprise a crank 170 that is configured to transmit torque to the drive roller 162 and cause the drive roller 162 to rotate. In one embodiment, the crank 170 can be coupled directly to the drive roller 162 such that rotation of the crank 170 causes rotation of the drive roller 162. Alternatively, the crank 170 can be configured to transmit torque to the drive roller 162 through intermediary elements such as, for example, gears.

The base member 110 can be rotatably engaged with an adjustable member 174 that is configured to apply a clamping force upon the sheet stock 158 and the drive roller 162 during normal operation of the plug plate dispensing assembly 100. In some embodiments, the adjustable member 174 can be coupled to one or more hinges 184 that are also coupled to the base member 110 such that the adjustable member 174 can be rotated with respect to the base member 110. The adjustable member 174 can be biased towards the drive roller 162 via one or more bias members 176 such as, for example, a spring or any other device capable of providing an elastic force.

The plug plate dispensing assembly 100 can further comprise a contact roller 172 that is rotatably engaged with the adjustable member 174 such as, for example, via one or more bearings. The one or more bias members 176 can be configured provide a clamping force between the contact roller 172 and the drive roller 162. During normal operation, the sheet stock 158 can be clamped between the contact roller 172 and the drive roller 162. Generally, the contact roller 172 and the drive roller 162 are oriented such that their respective axes of rotation are substantially parallel, while the sheet stock 158 is clamped between the contact roller 172 and the drive roller 162. Accordingly, rotation of the crank 170 can cause rotation of the drive roller 162 and the sheet stock 158 to be urged towards the base end 108 of the plug plate dispensing assembly 100, while contact roller 172 clamps the sheet stock and rotates with the drive roller 162.

The plug plate dispensing assembly 100 can further comprise a reel support member 140 that is coupled to the first riser 120 and the second riser 122. A reel 156 of plug plates 160 can be rotatably engaged with the reel support member 140. Accordingly, the reel support member 140 can support the reel 156 as the reel 156 rotates and the sheet stock 158 is pulled through the apex cross member 128, the lower cross member 130, and the central cross member 132. The apex cross member 128, the lower cross member 130, and the central cross member 132 can be coupled to the first riser 120 and the second riser 122 and can extend from the first riser 120 to the second riser 122.

The apex cross member 128, the lower cross member 130, and the central cross member 132 can be configured to at least partially remove one or more of the plug plates 160 from the sheet stock 158 as the sheet stock 158 passes through the dispensing end 106 of the plug plate dispensing assembly 100. In one embodiment, the lower cross member 130 can be disposed downwards from the apex cross member 128 and offset from the apex cross member 128 towards the front side 102 of the plug plate dispensing assembly 100. The central cross member 132 can be disposed downwards from the apex cross member 128 and upwards from the lower cross member 130. The central cross member 132 can be offset from the apex cross member 128 towards the back side 104 of the plug plate dispensing assembly 100. Accordingly, going from the front side 102 to the back side 104 of the plug plate dispensing assembly 100, the lower cross member 130 can be furthest towards to front side 102, then the apex cross member 128, and lastly the central cross member 132. Going from the dispensing end 106 to the base end 108 of the plug plate dispensing assembly 100, the apex cross member 128 can be furthest towards to the dispensing end 106, then the central cross member 132, and lastly the lower cross member 130.

Figure 4:
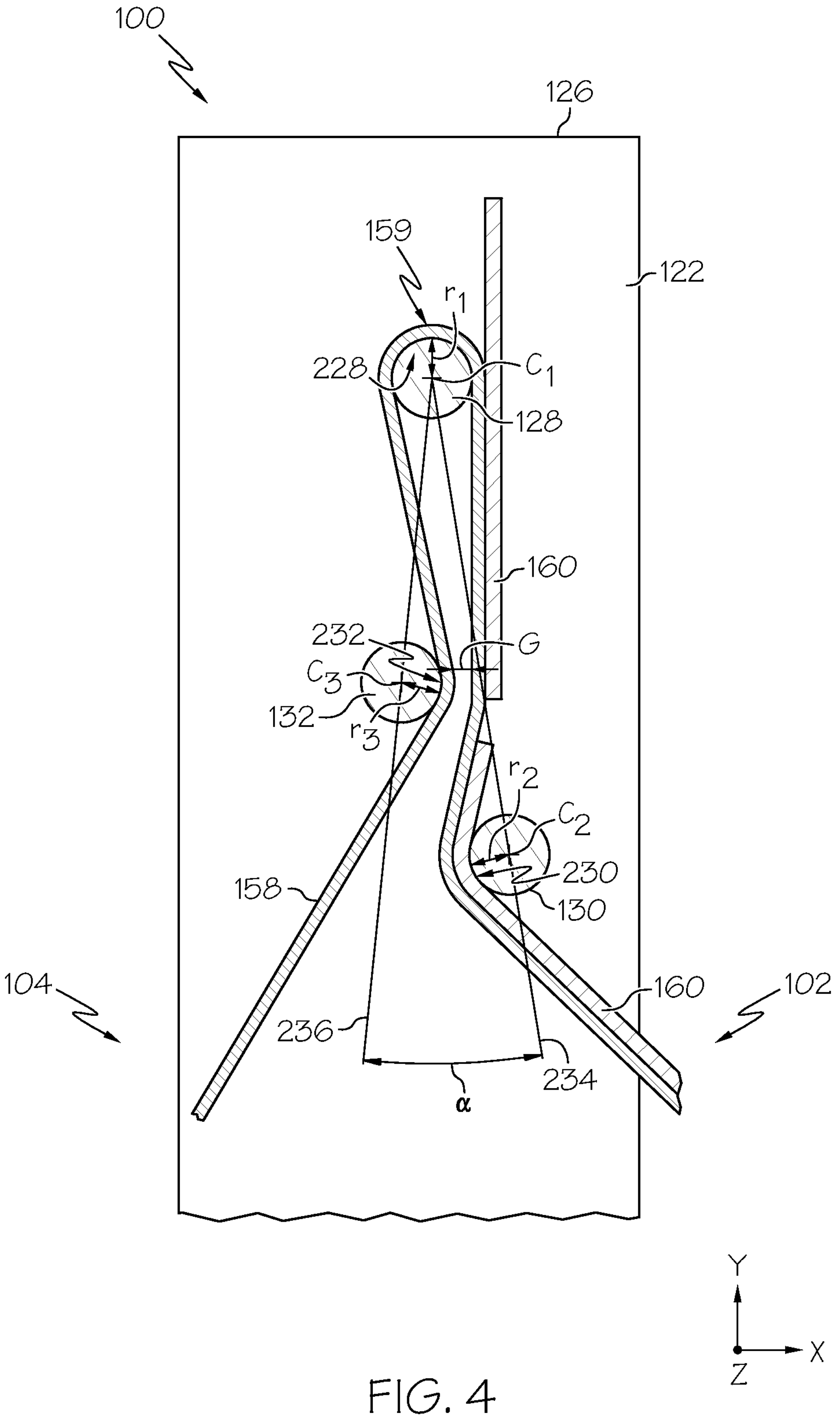
FIG. 4 schematically depicts a cross sectional view of a plug plate dispensing assembly according to one or more embodiments shown and described herein.

Referring now to FIG. 4, the apex cross member 128, the lower cross member 130, and the central cross member 132 can be shaped to mitigate binding or tearing of the sheet stock 158. Specifically, each of the apex cross member 128, the lower cross member 130, and the central cross member 132 includes a contact portion that is configured to contact the sheet stock 158. The contact portion can be curved to include a radius that is sufficiently large to mitigate tearing, the radius can be determined by fitting a circular arc to the contact portion and determining the radius of curvature that approximates the curve at about the center of the length of the circular arc. The contact portion 228 of the apex cross member 128 can have a radius r1, the contact portion 230 of the lower cross member 130 can have a radius r2, and the contact portion 230 of the central cross member 132 can have a radius r3. Each of the radius r1, the radius r2, and the radius r3, during normal operation, can be greater than about 1/32 inches (about 0.79 mm) such as, for example, greater than about 3/64 inches (about 1.19 mm) in one embodiment, greater than about 3/32 inches (about 2.38 mm) in another embodiment, or greater than about 3/16 inches (about 4.76 mm) in yet another embodiment. It is noted that, while the apex cross member 128, the lower cross member 130, and the central cross member 132 are depicted in FIG. 4 as having a substantially circular cross section, the apex cross member 128, the lower cross member 130, and the central cross member 132 can be any shape that includes a radius that is sufficiently large to mitigate tearing.

In one embodiment, the apex cross member 128, the lower cross member 130, and the central cross member 132 can be oriented at a release angle $\alpha$ with respect to one another in order to separate the plug plates 160 from the sheet stock 158 as the sheet stock 158 is pulled over the apex cross member 128. Specifically, each contact portion can be matched to circular arc having a center point. The contact portion 228 of the apex cross member 128 can have a center point c1, the contact portion 230 of the lower cross member 130 can have a center point c2, and the contact portion 232 of the central cross member 132 can have a center point c3. The release angle $\alpha$ can be measured using the center point c1 as the vertex and measuring the angle between a ray 234 that runs from the center point c1 through the center point c2 and a ray 236 that runs from the center point c1 through the center point c3. The release angle $\alpha$ can be an acute angle such as, for example, less than about 40° in one embodiment, less than about 20° in another embodiment, or about 15° in a further embodiment.

According to the embodiments described herein, the sheet stock 158 can be fed through the apex cross member 128, the lower cross member 130, and the central cross member 132. Specifically, the sheet stock 158 can be fed between the apex cross member 128 and the lower cross member 130. Accordingly, the contact portion 230 of the lower cross member 130 can be located towards the back side 104 of the lower cross member 130 such that the sheet stock 158 and/or the plug plates 160 are constrained from motion towards the front side 102 of the plug plate dispensing assembly 100. The sheet stock 158 can be fed over and around the apex cross member 128 such that the sheet stock 158 forms a radial fold 159. The contact portion 228 of the apex cross member 128 can be located towards the dispensing end 106 of the apex cross member 128 such that the sheet stock 158 is constrained from motion towards the base end 108 of the plug plate dispensing assembly 100. The sheet stock 158 can be fed between the apex cross member 128 and the central cross member 132. The contact portion 230 of the central cross member 132 can be located towards the front side 102 of the central cross member 132 such that the sheet stock 158 is constrained from motion towards the back side 104 of the plug plate dispensing assembly 100.

Accordingly, the sheet stock 158 can be constrained by the apex cross member 128, the lower cross member 130, and the central cross member 132. As the sheet stock 158 is pulled around the apex cross member 128 the plug plates 160 can be separated from the sheet stock. It is believed that the orientation of the apex cross member 128, the lower cross member 130, and the central cross member 132 facilitates removal of the plug plates 160. In one embodiment, the orientation of the apex cross member 128, the lower cross member 130, and the central cross member 132 can cause the sheet stock 158 to fold over itself without touching above the lower cross member 130 such that the sheet stock maintains a minimum gap G above the lower cross member 130 that is greater than about 0 mm. In another embodiment, the minimum gap G can be greater than about 0 mm and less than the sum of the radius r2 of the contact portion 230 of the lower cross member 130, and the radius r3 of the contact portion 230 of the central cross member 132.

Referring again to FIG. 2, the sheet stock 158 can be frictionally engaged with the drive roller 162 and clamped between the contact roller 172 and the drive roller 162. For example, the handle 178 can be urged away from the front side 102 of the plug plate dispensing assembly. As the handle 178 is urged away from the front side 102 of the plug plate dispensing assembly, the adjustable member 174 and the contact roller 172 can be moved away from the drive roller 162. The sheet stock 158 can be placed between the contact roller 172 and the drive roller 162. When the urging force is removed, the one or more bias members 176 can supply a force that clamps between the contact roller 172 and the drive roller 162.

When the sheet stock 158 is frictionally engaged with the drive roller 162, the crank 170 can be rotated to cause the drive roller to rotate and the sheet stock 158 to be urged towards the output orifice 114 of the base member 110. As the sheet stock 158 is moved, the reel 156 can rotate to unroll the sheet stock 158 from the reel 156. Contemporaneously, the sheet stock 158 can be urged through the apex cross member 128, the lower cross member 130, and the central cross member 132. Accordingly, the sheet stock 158 can be pulled over and around the apex cross member 128 such that the plug plates 160 peel away and at least partially detach from the sheet stock 158.

It should now be understood that the embodiments described herein can be utilized to at least partially automate a plug plate removal process. Specifically, a reel of sheet stock adhered to plug plates can be held by the plug plate dispensing assembly. The sheet stock can be fed through a plurality of cross members at a dispensing end of the plug plate dispensing assembly and frictionally engaged with a roller. As the sheet stock is pulled by the roller through the plurality of cross members, the plug plates can be detached from the sheet stock by the plurality of cross members. Accordingly, instead of manually peeling the plug plates from the sheet stock, the drive wheel can be rotated to remove the plug plates. Additionally, it is noted that, while the embodiments described herein depict a plug plate dispensing assembly for removing plug plates from a single reel, multiple plug plate dispensing assemblies can be coupled together to remove plugs from multiple reels at once. For example, multiple plug plates can each have a drive wheel that cooperates with a single crank mechanism.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Furthermore, it is noted that while the embodiments described herein are provided in relation to an x-y-z coordinate system in FIGS. 1-4, the arrangement of the elements of the embodiments described herein are to be interpreted as arranged in relation to one another and not to any fixed coordinate system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A plug plate dispensing assembly comprising:

a base member;

a first riser coupled to the base member, wherein the first riser extends upwards away from the base member;

a second riser coupled to the base member and offset laterally from the first riser, wherein the second riser extends upwards away from the base member;

a reel support member coupled to the first riser and the second riser, wherein the reel support member extends from the first riser to the second riser and is disposed on a front side of the plug plate dispensing assembly, and wherein the reel support member is configured to hold a reel comprising a plurality of plug plates adhered to a sheet stock;

an apex cross member coupled to the first riser and the second riser, wherein the apex cross member extends from the first riser to the second riser;

a lower cross member coupled to the first riser and the second riser, wherein the lower cross member extends from the first riser to the second riser, and wherein the lower cross member is disposed downwards from the apex cross member, and the lower cross member is offset from the apex cross member towards the front side of the plug plate dispensing assembly;

a central cross member coupled to the first riser and the second riser, wherein the central cross member extends from the first riser to the second riser, and wherein the central cross member is disposed downwards from the apex cross member and upwards from the lower cross member, and the central cross member is offset from the apex cross member towards a back side of the plug plate dispensing assembly;

a drive roller rotatably engaged with the first riser and the second riser, wherein when the sheet stock is fed between the lower cross member and the apex cross member, over the apex cross member, and between the apex cross member and the central cross member, and when the sheet stock is frictionally engaged with the drive roller, rotation of the drive roller causes one or more of the plurality of plug plates to at least partially detach from the sheet stock as the sheet stock passes over the apex cross member; and a contact roller that is substantially parallel to the drive roller, wherein the contact roller is biased toward the drive roller by a biasing member to provide a clamping force between the contact roller and the drive roller.

2. The plug plate dispensing assembly of claim 1, wherein the apex cross member comprises a contact portion that is configured to contact the sheet stock, and the contact portion is formed into a radius.

3. The plug plate dispensing assembly of claim 2, wherein the radius of the contact portion of the apex cross member is greater than about 1/32 inches.

4. The plug plate dispensing assembly of claim 1, wherein the central cross member comprises a contact portion that is configured to contact the sheet stock, and the contact portion is formed into a radius.

5. The plug plate dispensing assembly of claim 4, wherein the radius of the contact portion of the central cross member is greater than about 1/32 inches.

6. The plug plate dispensing assembly of claim 1, wherein the lower cross member comprises a contact portion that is configured to contact the sheet stock, and the contact portion is formed into a radius.

7. The plug plate dispensing assembly of claim 6, wherein the radius of the contact portion of the lower cross member is greater than about 1/32 inches.

8. The plug plate dispensing assembly of claim 1, wherein the apex cross member, the central cross member, and the lower cross member each has a substantially circular cross section.

9. The plug plate dispensing assembly of claim 8, wherein the central cross member has a first radius and the lower cross member has a second radius; and when the sheet stock is fed between the lower cross member and the apex cross member, over the apex cross member, and between the apex cross member and the central cross member, the sheet stock folds over itself without touching above the lower cross member such that the sheet stock maintains a minimum gap G that is greater than about 0 mm and less than a sum of the first radius of the central cross member and the second radius of the lower cross member.

10. The plug plate dispensing assembly of claim 1, wherein the apex cross member defines an apex of a release angle and the central cross member and the lower cross member each define a vertex of the release angle, and wherein the release angle is acute.

11. The plug plate dispensing assembly of claim 1, wherein when the sheet stock is fed between the lower cross member and the apex cross member, over the apex cross member, and between the apex cross member and the central cross member, the sheet stock folds over itself without touching above the lower cross member such that the sheet stock maintains a minimum gap G that is greater than about 0 mm.

12. The plug plate dispensing assembly of claim 1, wherein when the sheet stock is fed between the lower cross member and the apex cross member, over the apex cross member, and between the apex cross member and the central cross member, the sheet stock and at least one of the plurality of plug plates bend around the lower cross member.

13. A plug plate dispensing system, in combination with the plug plate dispensing assembly of claim 1, wherein each of the plurality of plug plates comprises polyvinyl chloride and a self-adhesive layer.

14. The plug plate dispensing assembly of claim 1, wherein the drive roller comprises a frictional layer comprising a polymer having carbamate functional group.

15. The plug plate dispensing assembly of claim 1, wherein the base member comprises an output orifice configured to receive and eject sheet stock from the plug plate dispensing assembly, and wherein the clamping force between the contact roller and the drive roller directs the sheet stock through the output orifice of the base member.

16. The plug plate dispensing assembly of claim 1 further comprising an adjustable member hingedly coupled to the base member, wherein the contact roller is coupled to the adjustable member, and the biasing member is coupled to the adjustable member and one of the first or second riser, the biasing member biasing the adjustable member and the contact roller toward the drive roller to provide the clamping force between the contact roller and the drive roller.

17. A plug plate dispensing assembly comprising:

a base member;

a first riser coupled to the base member, wherein the first riser extends upwards away from the base member;

a second riser coupled to the base member and offset laterally from the first riser, wherein the second riser extends upwards away from the base member;

a reel support member coupled to the first riser and the second riser, wherein the reel support member extends from the first riser to the second riser and is disposed on a front side of the plug plate dispensing assembly, and wherein the reel support member is configured to hold a reel comprising a plurality of plug plates adhered to a sheet stock;

an apex cross member coupled to the first riser and the second riser, wherein the apex cross member extends from the first riser to the second riser;

a lower cross member coupled to the first riser and the second riser, wherein the lower cross member extends from the first riser to the second riser, and wherein the lower cross member is disposed downwards from the apex cross member, and the lower cross member is offset from the apex cross member towards the front side of the plug plate dispensing assembly;

a central cross member coupled to the first riser and the second riser, wherein the central cross member extends from the first riser to the second riser, the central cross member is disposed downwards from the apex cross member and upwards from the lower cross member, and the central cross member is offset from the apex cross member towards a back-side of the plug plate dispensing assembly, and wherein the apex cross member, the central cross member, and the lower cross member each has a substantially circular cross section that has a center point such that the center point of the apex cross member defines an apex of a release angle, a first ray is defined from the center point of the apex cross member to the center point of the central cross member and a second ray is defined from the center point of the apex cross member to the center point of the lower cross member, and the release angle measured between the first ray and the second ray is less than about 20°;

a drive roller rotatably engaged with the first riser and the second riser, wherein when the sheet stock is fed between the lower cross member and the apex cross member, over the apex cross member, and between the apex cross member and the central cross member, and when the sheet stock is frictionally engaged with the drive roller, rotation of the drive roller causes one or more of the plurality of plug plates to at least partially detach from the sheet stock as the sheet stock passes over the apex cross member; and a contact roller that is substantially parallel to the drive roller, wherein the contact roller is biased toward the drive roller by a biasing member to provide a clamping force between the contact roller and the drive roller.

18. The plug plate dispensing assembly of claim 17, wherein a cross section of each of the apex cross member, the central cross member, and the lower cross member has a radius that is greater than about $\frac{1}{32}$ inches.

19. The plug plate dispensing assembly of claim 17, wherein when the sheet stock is fed between the lower cross member and the apex cross member, over the apex cross member, and between the apex cross member and the central cross member, the sheet stock folds over itself without touching above the lower cross member such that the sheet stock maintains a minimum gap G that is greater than about 0 mm.

20. A plug plate dispensing assembly comprising:

a base member;

a first riser coupled to the base member, wherein the first riser extends upwards away from the base member;

a second riser coupled to the base member and offset laterally from the first riser, wherein the second riser extends upwards away from the base member;

a reel support member coupled to the first riser and the second riser, wherein the reel support member extends from the first riser to the second riser and is disposed on a front side of the plug plate dispensing assembly, and wherein the reel support member is configured to hold a reel comprising a plurality of plug plates adhered to a sheet stock;

an apex cross member coupled to the first riser and the second riser, wherein the apex cross member extends from the first riser to the second riser;

a lower cross member coupled to the first riser and the second riser, wherein the lower cross member extends from the first riser to the second riser, and wherein the lower cross member is disposed downwards from the apex cross member, and the lower cross member is offset from the apex cross member towards the front side of the plug plate dispensing assembly;

a central cross member coupled to the first riser and the second riser, wherein the central cross member extends from the first riser to the second riser, the central cross member is disposed downwards from the apex cross member and upwards from the lower cross member, and the central cross member is offset from the apex cross member towards a back-side of the plug plate dispensing assembly, and wherein the apex cross member, the central cross member, and the lower cross member each has a substantially circular cross section that has a center point such that the center point of the apex cross member defines an apex of a release angle, a first ray is defined from the center point of the apex cross member to the center point of the central cross member and a second ray is defined from the center point of the apex cross member to the center point of the lower cross member, and the release angle measured between the first ray and the second ray is acute;

a drive roller rotatably engaged with the first riser and the second riser, wherein when the sheet stock is fed between the lower cross member and the apex cross member, over the apex cross member, and between the apex cross member and the central cross member; and a contact roller that is substantially parallel to the drive roller, wherein the contact roller is biased toward the drive roller by a biasing member to provide a clamping force between the contact roller and the drive roller, and when the sheet stock is frictionally engaged with the drive roller:

the sheet stock folds over itself without touching above the lower cross member such that the sheet stock maintains a minimum gap G that is greater than about 0 mm and less than a sum of a first radius of the central cross member and a second radius of the lower cross member; and rotation of the drive roller causes one or more of the plurality of plug plates to at least partially detach from the sheet stock as the sheet stock passes over the apex cross member.

* * * * *